March 5, 1963 D. J. IAQUINTA 3,079,971
TIRE COVER
Filed Nov. 28, 1961 3 Sheets-Sheet 2

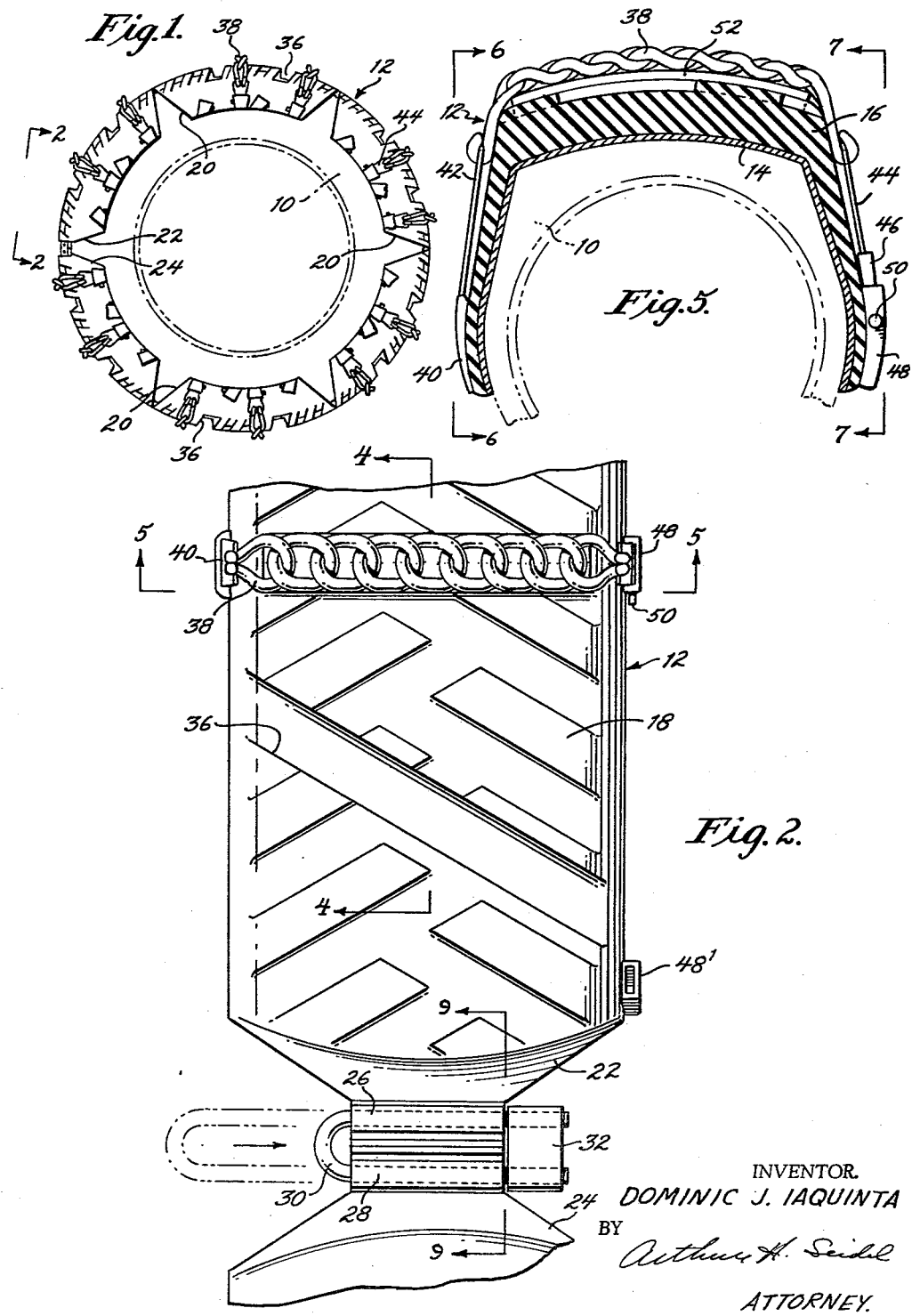

INVENTOR.
DOMINIC J. IAQUINTA
BY
ATTORNEY.

INVENTOR.
DOMINIC J. IAQUINTA
BY
Arthur H. Seidel
ATTORNEY.

з,079,971
Patented Mar. 5, 1963

3,079,971
TIRE COVER
Dominic J. Iaquinta, 3811 N. 7th St., Philadelphia 40, Pa.
Filed Nov. 28, 1961, Ser. No. 155,409
4 Claims. (Cl. 152—179)

This invention relates to a tire cover, and more particularly to a cover which may be applied to conventional tires and thereby render such tires capable of providing the necessary traction to cope with all degrees of snow, ice, mud, etc.

The tire cover of the present invention is in the nature of an elongated flexible sheet which may be readily applied to the periphery of the tire in a rapid manner. The tire cover of the present invention may be applied to a tire without the necessity of jacking up the vehicle. The tire cover of the present invention includes chain units which may be disposed in a position to provide traction and in another position wherein the chain units are recessed so that the chain units do not provide traction.

The tire cover of the present invention is preferably provided with a tread portion which simulates a "snow" tread. Hence, the tire cover of the present invention enables a person to convert ordinary tires into "snow" tires. Likewise, the present invention enables the so-modified tire to be converted from a "snow" tire into a snow tire having chain units thereon. All of these desirable features are accomplished without jacking up the vehicle. The conversion from one type of tire to another is capable of being accomplished by a man having little mechanical skill. The tire cover of the present invention includes chain units having an operative and inoperative disposition so that the cover is applicable to all road hazards and conditions without subjecting the chain units to unnecessary wear.

It is an object of the present invention to provide a novel tire cover.

It is another object of the present invention to provide a tire cover which enables a conventional tire to be readily converted into a snow tire.

It is still another object of the present invention to provide a novel tire, which enables a conventional tire to be converted into a snow tire having chain units on the periphery thereof.

It is a still further object of the present invention to provide a tire cover which may be readily secured around the tread portion of a conventional tire.

It is yet another object of the present invention to provide a novel tire cover having chain units capable of having an operative disposition and an inoperative disposition.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a side elevation view of a tire having the tire cover of the present invention mounted thereon.

FIGURE 2 is an enlarged view taken along the lines 2—2 in FIGURE 1.

FIGURE 5 is a sectional view taken along the lines 5—5 in FIGURE 2.

Figure 3:
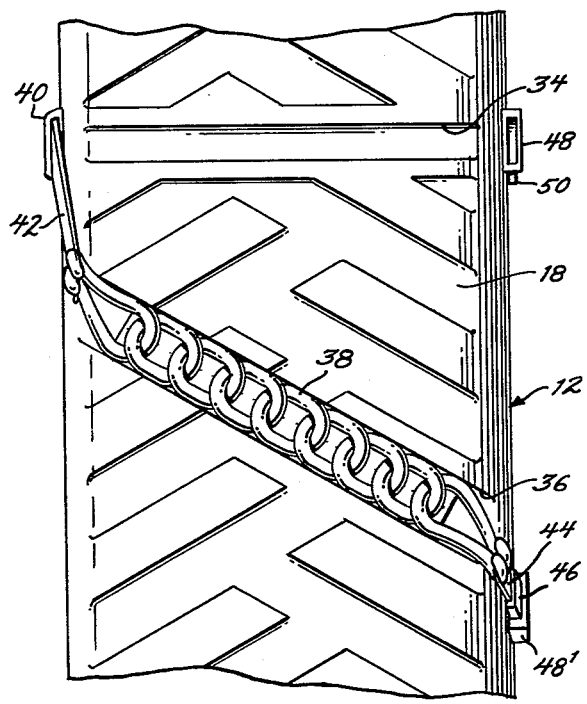
FIGURE 3 is an enlarged view similar to FIGURE 2 but showing the chain unit in its inoperative disposition.

Referring to the drawings in detail, wherein like numerals indicate like elements, there is shown in FIGURE 1 a tire designated generally as 10. The tire cover of the present invention designated generally as 12 is illustrated in FIGURE 1 as being applied around the periphery of the tire 10.

The tire cover 12 of the present invention is a U-shaped member in transverse cross-section and is of sufficient length so that it may extend around the entire peripheral tread portion of the tire 10 and the portions of the side wall of the tire 10 adjacent the tread portion.

As shown more clearly in FIGURE 5, the tire cover 12 is laminar in structure. The tire cover 12 includes a fabric liner 14 having an outer layer of rubber 16. The layer of rubber 16 is provided with a tread portion 18 which is in the form of a snow tread. In order to facilitate application of the tire cover 12 to the tire 10, the tire cover 12 may be provided with a plurality of V-shaped slits 20 extending from the side edges thereof toward the tread portion 18. As shown more clearly in FIGURE 1, the tire cover 12 is provided with six such slits. It will be appreciated that a greater or lesser number of slits may be provided as desired. The slits 20 facilitate the flexibility of the tire cover 12 and divide the tire cover 12 into a plurality of sections.

Figure 9:
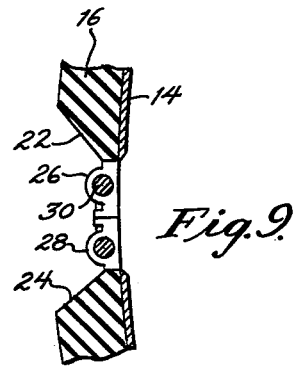
FIGURE 9 is a sectional view taken along the lines 9—9 in FIGURE 2.

As shown more clearly in FIGURES 2 and 9, the tire cover 12 is provided with ends 22 and 24. The end 22 terminates in a sleeve 26. The end 24 terminates in a sleeve 28. The sleeves 26 and 28 are selectively locked together by means of a U-shaped lock 30. A lock member 32 is selectively applied to the free ends of the lock 30. The cooperation between the locking of the ends of the tire cover 12 and the U-shape of the cover 12 in transverse cross-section maintain the cover 12 in an operative disposition around the tire 10.

Figure 6:
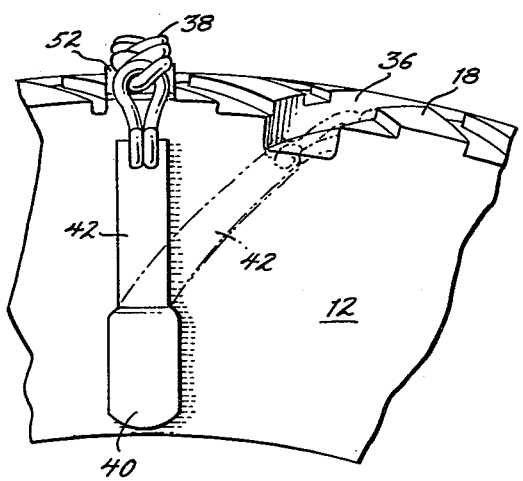
FIGURE 6 is a side view taken along the lines 6—6 in FIGURE 5.

Each of the sections of the tire cover 12 as formed by the slits 20 are provided with a channel 34 and a channel 36. The channel 34 extends transversely across the tread portion 18. The channel 36 extends obliquely across the tread portion 18. As shown more clearly in FIGURES 4–6, the channel 36 is deeper than the channel 34. The purpose for the difference in depth of the channels 34 and 36 will be made clear hereinafter. Also, it will be noted that the channel 36 is wider than the channel 34 as shown more clearly in FIGURE 4.

A chain unit 38 is provided on each of the sections of the tire cover 12. The chain unit 38 is adapted to have an operative disposition when it is disposed within the channel 34 and an inoperative disposition when it is disposed within the channel 36.

A retainer 40 is integrally secured to the side wall portion of the tire cover 12 in alignment with each of the channels 34. One end of an elastic strap 42 is fixedly secured to the retainer 40. The other end of the strap 42 is connected to one end of the chain unit 38. The other end of the chain unit 38 is secured to one end of an elastic strap 44. The other end of the elastic strap 44 is secured to a keeper 46.

Figure 8:
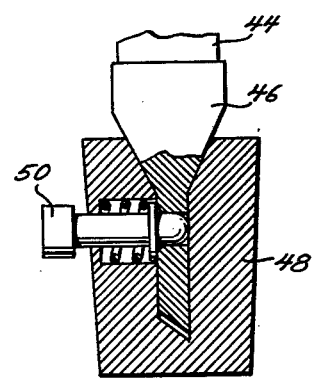
FIGURE 8 is an enlarged sectional view illustrating details of the means for securing one end of the chain unit.

As shown more clearly in FIGURE 8, the keeper 46 is adapted to be disposed within a slot in a retainer 48. The keeper 46 is provided with a hole therethrough which is adapted to receive one end of a pin 50. The pin 50 is biased to a position wherein said one end will enter the hole in the keeper 46. The keeper 46 may be removed from its securement by the retainer 48 by pulling on the pin 50 in a direction against the bias of the spring.

A retainer 48 is integrally secured to a side wall of the tire cover 12 in alignment with each of the channels 34. It will be noted that the retainers 40 and 48 are on opposite sides of the tire cover 12.

A retainer 48' is secured to the side wall of the tire cover 12 in line with each channel 36. The retainer 48' is integrally secured to a side wall of tire cover 12 on the same side as the retainers 48. As will be made clear hereinafter, the retainer 48' cooperates with the retainer 40 to assist in maintaining the chain unit 38 in its inoperative disposition.

Figure 4:
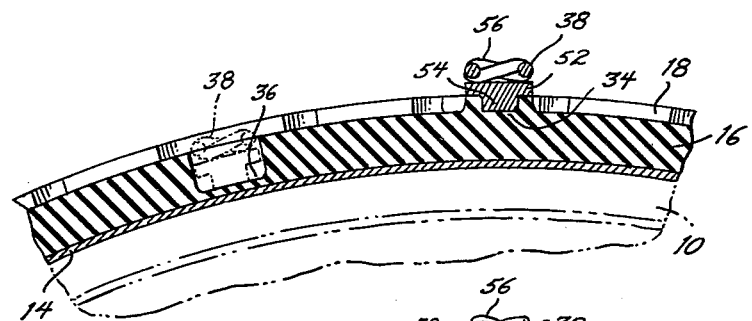
FIGURE 4 is a sectional view taken along the lines 4—4 in FIGURE 2.
Figure 7:
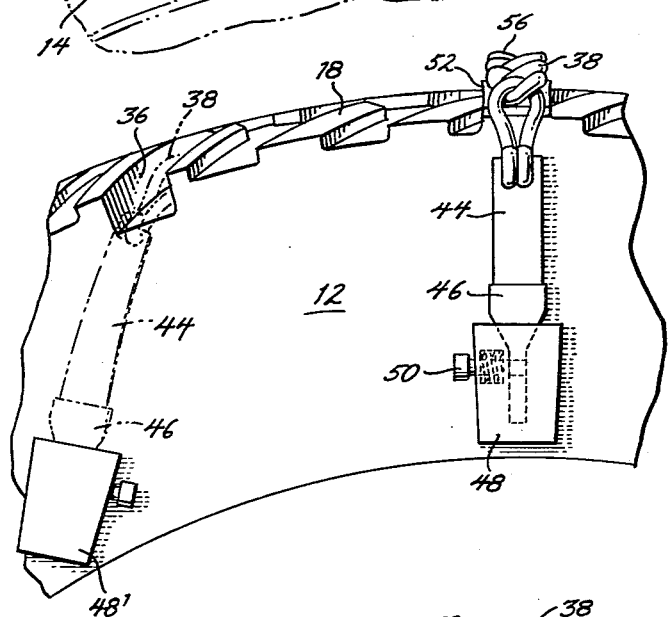
FIGURE 7 is a side view taken along the lines 7—7 in FIGURE 5.

As shown more clearly in FIGURE 4, each chain unit 38 comprises a base 52 having a rib 54 extending substantially perpendicular therefrom along the entire length thereof. Hence, the base 52 and rib 54 are T-shaped in transverse cross-section. The rib 54 is adapted to be received within the channel 34 in a manner so that it is in abutting engagement with the bottom and side walls defining the channel 34. A length of chain 56 is integrally secured to the base 52 in any convenient manner. If the base 52 is made from metal, the length of chain 56 may be welded thereto. If the base 52 and rib 54 are made from a semi-flexible material, such as nylon, the length of chain 56 may be fused thereto.

Figures 10, 11, 12:
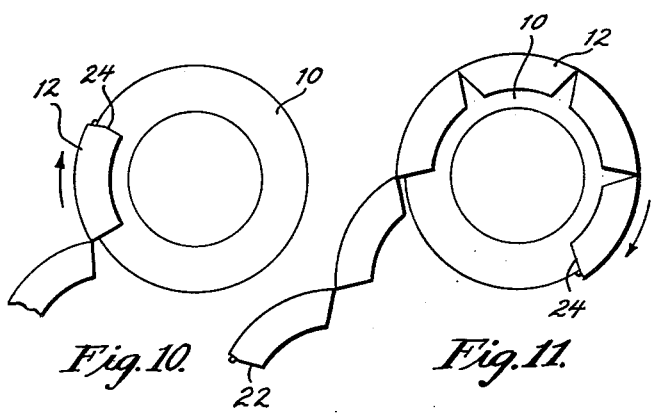
FIGURES 10–12 are diagrammatic views illustrating the sequence of steps in applying the tire cover of the present invention to a tire.

The tire cover 12 of the present invention is utilized in conjunction with a conventional tire 10 as follows:

As shown more clearly in FIGURES 10–12, the tire cover 12 is applied to the tire 10 one section at a time. A section comprises that portion of the tire cover 12 between adjacent slits 20. After the tire cover 12 has been passed around the periphery of the tire 10 to the position illustrated in FIGURE 11, the vehicle is moved in a rearward direction so that the tire 10 rotates in the direction of the arrow in FIGURE 12 thereby placing the ends 22 and 24 juxtaposed to each other. Thereafter, the U-shaped lock 30 is extended through the sleeves 26 and 28. The lock member 32 is applied to interconnect the free ends of the lock 30 thereby cooperating with the U-shape of the tire cover 12 to retain the cover 12 on the tire 10.

Due to the snow tread design of the tread portion 18, the conventional tire 10 has been converted into a snow tire. When the so-converted tire 10 is being utilized as a snow tire, the chain units 38 will be disposed within the channels 36 as illustrated in FIGURE 3. As shown more clearly in FIGURE 4, the phantom illustration of the chain unit 38 is disposed below the level of the tread portion 18 so that the chain unit 38 will be in an inoperative disposition. The elasticity and flexibility of the straps 42 and 44 maintain the chain unit 38 centered with respect to the tread portion 18 as shown more clearly in FIGURE 3.

When it becomes clear to the operator of the vehicle that the snow tread tire is not providing sufficient traction, the chain units 38 may be readily moved from their inoperative to their operative disposition. In order to move the chain unit 38 to an operative disposition, pressure is applied against the head of the pin 50 in a direction away from the keeper 46 thereby compressing the spring in the retainer 48. This permits the pin 50 to clear the keeper 46. Thereafter, the operator of the vehicle may swing the chain unit 38 to a position whereby the rib 54 may enter the channel 34. During this step, the strap 42 will have resumed its normal shape.

Since the channel 34 is not as deep nor as wide as the channel 36, only the rib portion 54 will enter the channel 34. Hence, the length of chain 56 will project radially outwardly beyond the periphery of the tread portion 18. The keeper 46 will be retained within the retainer 48 in the same manner as illustrated in FIGURE 8. While the straps 40 and 44 are made of elastic material, the elasticity of the straps does not enable the chain units 38 to be accidentally removed from their operative disposition because of the mating engagement between the rib 54 and the channel 34. To increase the mating relationship, the rib 54 may be in snap-fitted friction engagement with the side walls of the channel 34. To facilitate the conversion of the chain unit 38 from an operative position to an inoperative position, the tire cover 12 should be applied to the tire 10 in a manner so that the retainers 48 and 48' are on the outward side of the tire 10 as illustrated in FIGURE 1.

As shown more clearly in FIGURE 5, the channel 34 is arcuate to conform with the arcuate shape of the tread portion on the tire 10. The channel 36 will have a similar arcuate shape.

The present invention may be embodied in other specific forms without departing from the spirit or essential attributes thereof and, accordingly, reference should be made to the appended claims, rather than to the foregoing specification as indicating the scope of the invention.

I claim:

1. A tire cover designed for application around the periphery of a tire of a vehicle comprising a strip of rubber-like material, means for selectively interconnecting the free ends of said strip, means mounting chain units across a central portion of said strip at spaced points along said strip, said mounting means facilitating the disposition of said chain units in an operative and an inoperative disposition with respect to said tread portion, said mounting means including a first channel for receiving a chain unit in its operative disposition, and a second channel for receiving a chain unit in its inoperative disposition.

2. A tire cover in accordance with claim 1 wherein said second channel is wider and deeper than said first channel.

3. Apparatus comprising an elongated strip of flexible material, said strip having a tread portion along a central section thereof, sets of first and second channels across said tread portion at spaced points therealong, each second channel being wider and deeper than each first channel, and means for mounting a chain unit on said strip so that a chain unit may be mounted in said first channel and selectively moved to a disposition within said second channel, the depth of said first channel being less than the height of a chain unit, and the depth of said second channel being greater than the height of a chain unit.

4. Apparatus in accordance with claim 3 wherein said strip is U-shaped in transverse cross-section, and said means for mounting chain units being disposed on opposite side walls of said strip.

References Cited in the file of this patent

UNITED STATES PATENTS

| | | |
|---|---|---|
| 1,105,121 | Wright | July 28, 1914 |
| 1,424,882 | Cucchiara | Aug. 8, 1922 |
| 1,439,527 | Moore | Dec. 19, 1922 |
| 1,456,729 | Fraser | May 29, 1923 |
| 2,157,004 | Nelson | May 2, 1939 |
| 2,537,231 | Necrason | Jan. 9, 1951 |